Dec. 7, 1948.   A. C. WILLIAMS   2,455,543
CAPACITOR TESTING INSTRUMENT
Filed Aug. 20, 1947   6 Sheets-Sheet 1

INVENTOR.
Alan C. Williams.
BY
Bair & Freeman
Att'ys.

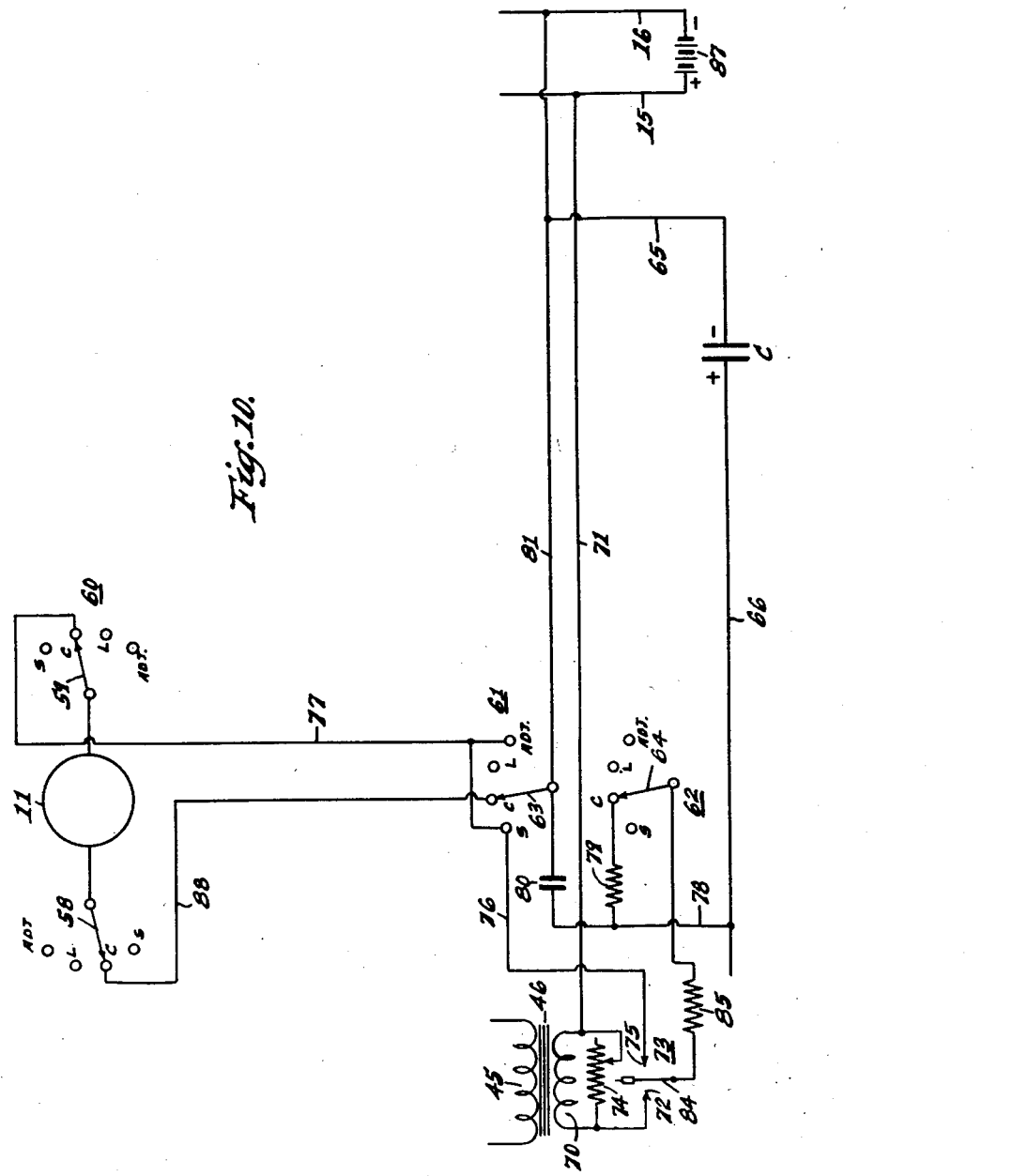

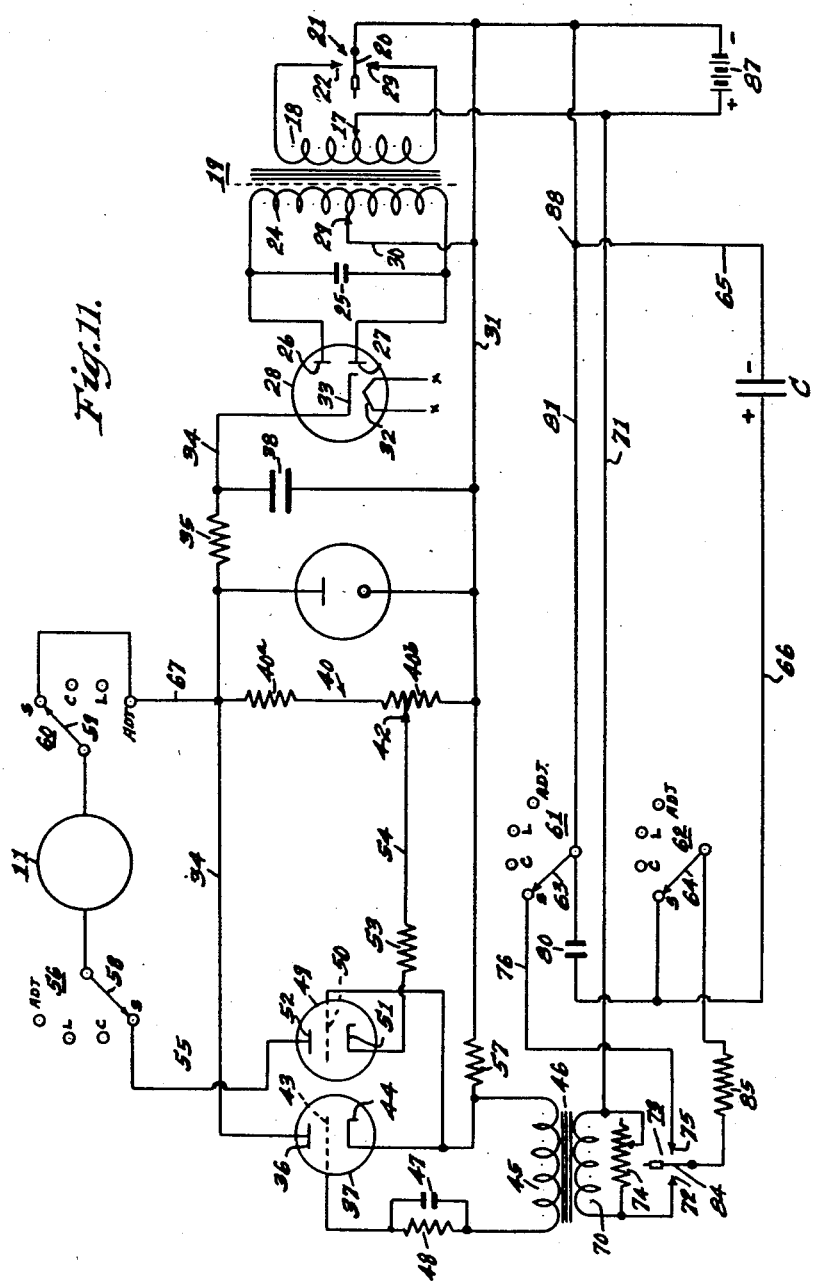

Dec. 7, 1948.　　　　A. C. WILLIAMS　　　　2,455,543
CAPACITOR TESTING INSTRUMENT
Filed Aug. 20, 1947　　　　　　　　　　　　6 Sheets-Sheet 6
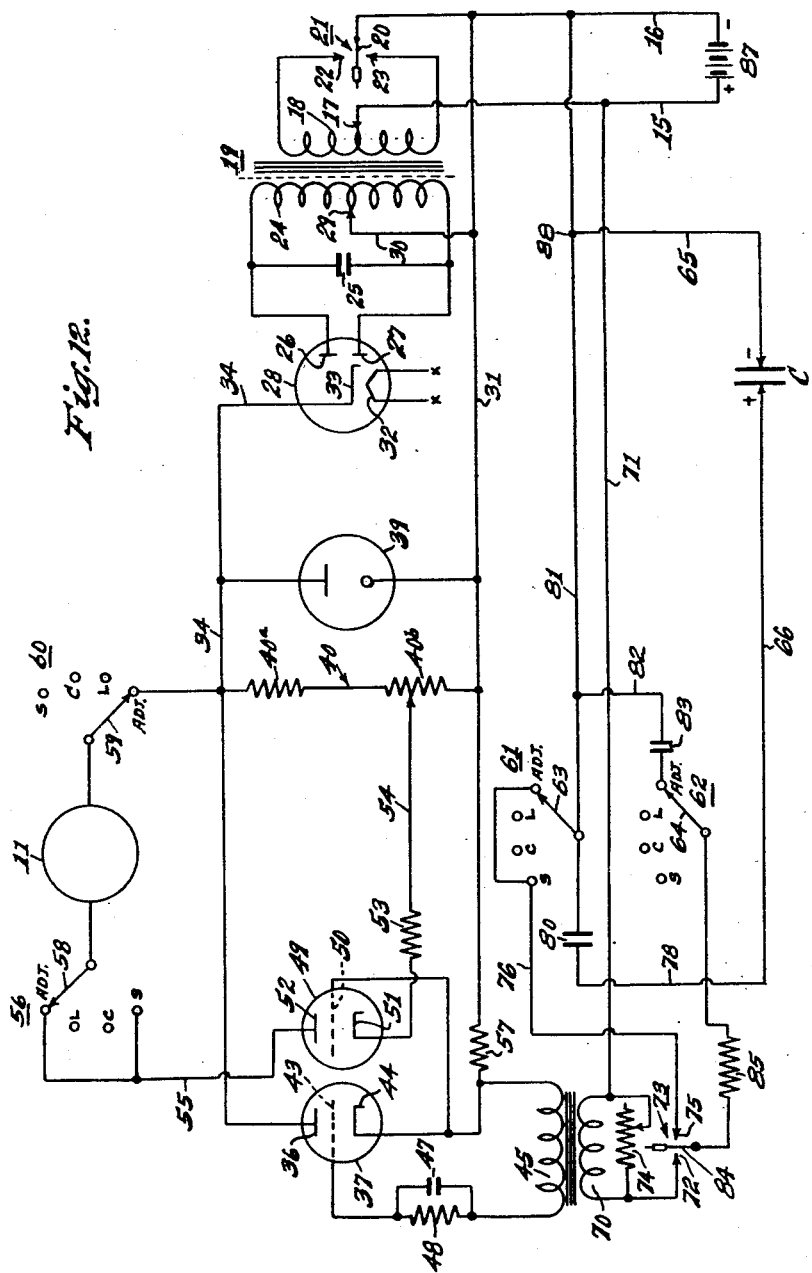
INVENTOR.
Alan C. Williams.
BY Bair & Freeman
Att'ys.

Patented Dec. 7, 1948

2,455,543

UNITED STATES PATENT OFFICE 2,455,543

CAPACITOR TESTING INSTRUMENT

Alan C. Williams, Minneapolis, Minn., assignor to Franklin Transformer Manufacturing Company, Minneapolis, Minn., a copartnership Application August 20, 1947, Serial No. 769,633

4 Claims. (Cl. 175—183)

This invention relates to instruments for testing electrostatic capacitors and has to do more specifically with an instrument designed for the three-fold purpose of measuring capacity, series resistance, and leakage resistance.

One of the objects of my invention is to provide an instrument which will afford direct and accurate electrostatic capacity readings on a meter scale.

Another object is to provide a capacitor testing instrument which will afford direct indications of series resistance in the capacitor.

A further object is to provide a compact, portable instrument for measuring electrostatic capacity, series resistance and leakage resistance, wherein a single meter serves all three purposes.

A further object is to provide an instrument of the aforementioned character, which is especially well adapted for testing ignition capacitors, and which is further adapted to utilize an automobile battery or the like, as a source of operating current—thus avoiding the need for a special battery or other voltage source, which would add to the weight and bulk of the instrument.

One of the features of my invention consists in a novel system and method for measuring electrostatic capacity, and contemplates an arrangement wherein the capacitor under test is alternately charged and discharged from a current source of constant voltage and at a fixed periodic rate, so that the quantum of charging current during a given unit of time is directly proportional to the capacity of the capacitor under test—wherefore a measurement of current flow during either charge or discharge periods, or both, is either translatable into a capacity value or may be directly readable as such, depending upon whether the meter forming a part of the instrument is calibrated to read in terms of capacity or in terms of voltage or current. According to the preferred practice, the meter is calibrated to read directly in capacity units.

Another feature of my invention resides in the novel method of measuring series resistance in electrostatic capacitors, and which is operative independently of the capacity of the capacitor under test. In making use of this method, I capitalize upon the fact that the impedance of any capacitor is, within practical limits, negligible, by comparison with its series resistance, at the outset of each charging period. That is to say, the counter E. M. F. of any uncharged capacitor is zero at the instant of commencement of any charging period. Thus, in any circuit comprising only capacity and resistance in series, the sole impedance at the commencement of any charging period is that due to the resistance only, and, therefore, given a constant voltage, the resulting current will have an initial peak value, the magnitude of which is independent of electrostatic capacity—which current will diminish as the capacitor or capacitors in the circuit become charged. If the capacity of the circuit is large, the current flow will diminish slowly, but if the capacity is small, the current flow will diminish very rapidly. But, in either case, the capacitative reactance of the circuit is zero at the outset of each charging period, and, consequently, the starting current is the same, whether the capacity is large or small, and depends entirely upon the non-capacitative impedance of the circuit. By utilizing only the peak values of current as a means of producing indications, I am able to obtain direct measurements of series resistance, the accuracy of which is substantially unaffected by the electrostatic capacity of the capacitor under test. This renders the instrument immediately available for making series resistance tests without the necessity for making adjustments to compensate for capacity differences.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figs. 1 to 7, inclusive, are simple circuit diagrams, illustrating the basic principle underlying certain aspects of this invention;

Fig. 10 is a fragmentary circuit diagram showing only those parts of the network of Fig. 9 which are employed in the making of capacity measurements;

Figure 9:
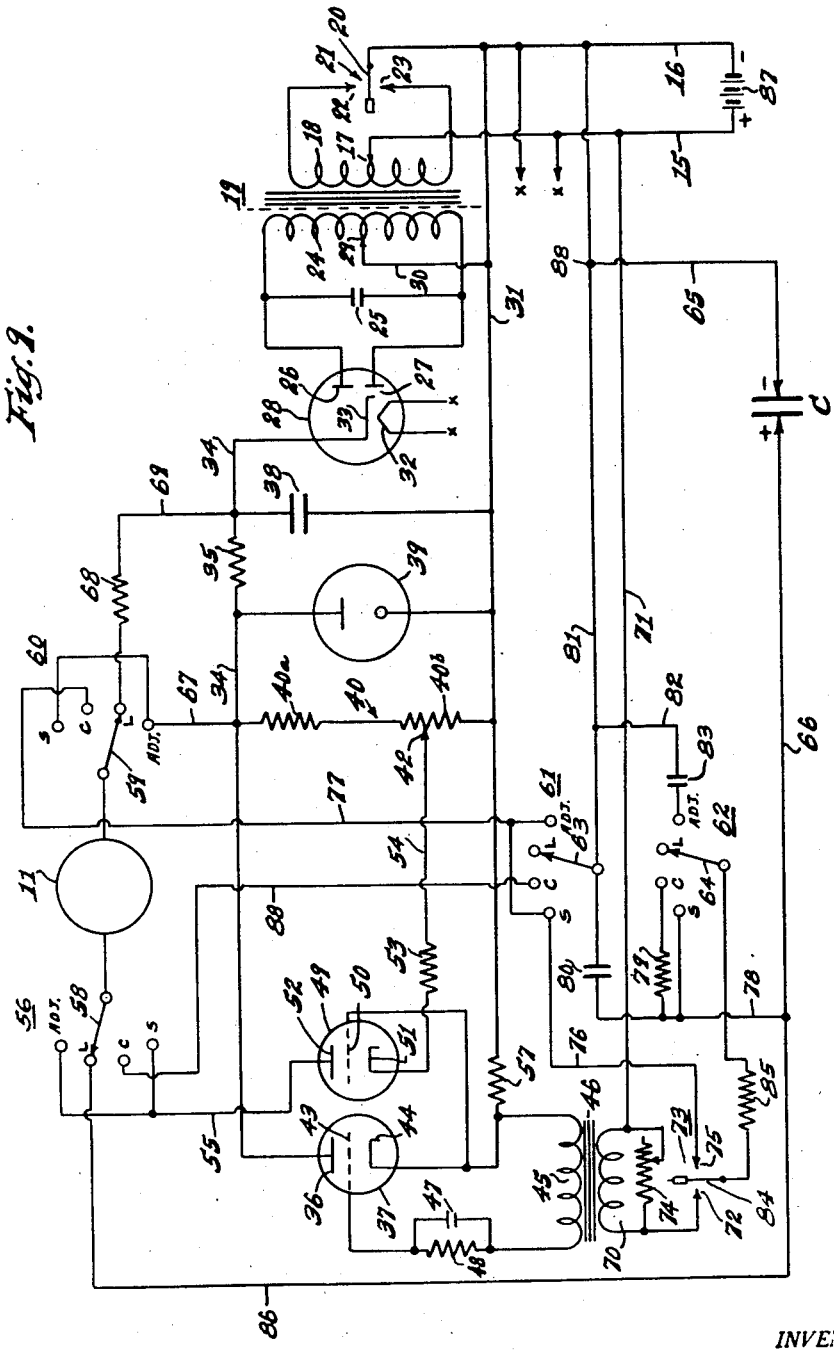
Fig. 9 is a circuit diagram of the complete instrument.

Fig. 11 is a circuit diagram showing the network of Fig. 9 adjusted for the making of series resistance measurements and omitting those parts of Fig. 9 which are not utilized in connection with the series resistance tests; and Fig. 12 is a circuit diagram showing the network of Fig. 9 with the switches set to the "adjust" positions and omitting those parts of the network of Fig. 9 which perform no function when the switches are so positioned.

Figure 1:
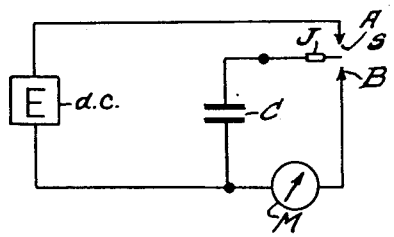

The network shown schematically in Fig. 1 is for the purpose of measuring electrostatic capacity and includes a capacitor C, the capacity of which is to be determined. Included in the network is a source of D. C. voltage E, a meter, and a two-way switch having a movable contact member J and a pair of fixed contacts A and B. The source E may be a 6-volt storage battery. The meter M may be an ordinary D. C. ammeter or milliammeter, and the two-way switch S may be an electromagnetic vibrator wherein the member J is a vibrating reed making contact alternately with fixed contacts A and B. Each time member J engages contact A, a circuit is completed from source E through capacitor C, and the latter is fully charged at the voltage of source E, which is of constant value. It will be apparent that the quantum of the charge thus imparted to capacitor C is directly proportional to the capacity of that element, provided, of course, that the contact time is sufficient to permit the capacitor to become fully charged; and it will be evident that when member J thereafter engages contact B, a definite quantum of electricity, proportionate in magnitude to the capacity of capacitor C, will be discharged through meter M, and that the latter will be deflected correspondingly. If the two-way switch is operated at a fairly rapid rate, the meter M will show a steady reading which is proportionate to the capacity of the capacitor under test. It is preferable that the contact time be sufficient to allow for fully charging the largest capacitor for which the instrument is designed; and where that may involve such a slow rate of operation of the two-way switch as to tend to cause the meter to fluctuate, it may be necessary to provide for damping the meter in order to counteract the fluctuation.

Figure 2:
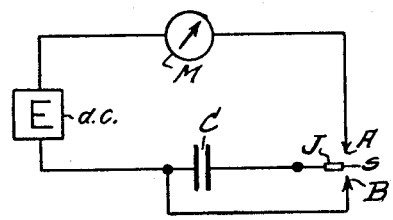

The arrangement depicted in Fig. 2 is equivalent to that of Fig. 1 but differs therefrom in that meter M is inserted in the charge path instead of the discharge path. It will be observed that in Fig. 1 the meter is actuated by the discharge from capacitor C, whereas in Fig. 2 it is actuated by the charging current. The end results are identical.

Figure 3:
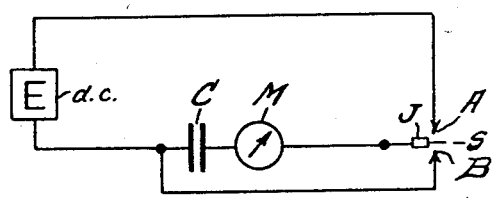

The arrangements of Figs. 1 and 2 both permit of the use of direct current meters; but in Fig. 3 I have shown a modification which utilizes an alternating current meter. In this instance, the meter M is interposed between the contact member J and one terminal of capacitor C, and is traversed by both the charging and discharging current. Aside from entailing the use of an A. C. meter, the arrangement of Fig. 3 is equivalent to the arrangements of Figs. 1 and 2.

Figure 4:
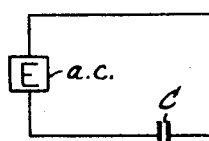

In Fig. 4, I have illustrated the basic method which I employ in measuring the series resistance of a capacitor. In this instance, the capacitor has an unknown series resistance, which is identified by a symbolic resistor element $R_x$. It will be understood that the resistance $R_x$ is incorporated in the capacitor and is not external thereof as might be supposed from the diagram. Its effect, however, is equivalent to an external series resistance, and it may, therefore, properly be represented in the diagram as an added element. But since it is not, in fact, such an element, it is not possible to determine its ohmic value by directly measuring voltage drop thereacross. Connected in series with capacitor C is a source E of alternating or pulsating direct current, which source may be a relaxation oscillator, a trigger type oscillating circuit, a capacitor charge-discharge circuit, or a circuit deriving its alternating or pulsating nature from a mechanical action, such as a vibrating or rotating or reciprocating device. The resistance or impedance of source E should be comparable to the series resistance $R_x$. Also included in the circuit of Fig. 4 is a resistor $R_a$, across which is connected an alternating current meter M. The ohmic value of resistor $R_a$ is preferably of the same order as the probable series resistance $R_x$. The alternating or pulsating current flowing in the network is a function of its series impedance, and since any variation in the value of $R_x$ introduces a similar variation in the total series impedance, it will be apparent that the current flow through resistance $R_a$ and the voltage drop thereacross will vary correspondingly. Hence, the deflection of meter M provides a measure of the value of $R_x$.

Figure 5:
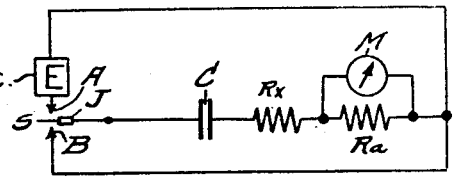

Fig. 5 illustrates schematically an arrangement similar to that of Figure 4 for measuring series resistance wherein a D. C. source is employed in place of the alternating or pulsating source E of Fig. 4. In this case, there is provided a two-way switch S having fixed contacts A and B and a moving contact member J, which alternately and periodically engages contacts A and B. When member J engages contact A, a charging circuit is completed from D. C. source E through capacitor C including its series resistance $R_x$ and resistor $R_a$, across which is connected an A. C. volt meter M. When, on the other hand, member J engages contact B, a discharge path is provided for capacitor C, which path includes resistor $R_a$ and the series resistance $R_x$. The principle of operation is otherwise the same as that of Fig. 4.

Figure 6:
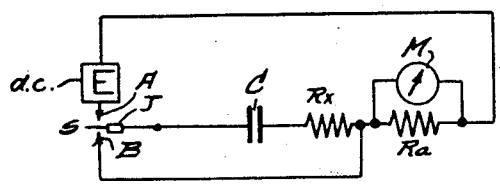

In Fig. 6 there is shown an arrangement very similar to that of Fig. 5, but involving a modification which enables the use of a D. C. meter. In this case, the discharge path includes only capacitor C, wherefore current flows in one direction only through resistor $R_a$.

The networks of Figs. 4–6, inclusive, can be made to effect accurate direct readings of series resistance where the magnitude of capacitor C is fixed; and it can also be made to give readings from which series resistance values can be computed, where the capacity value is known but not fixed. But in order to be able to achieve direct readings of series resistance, where the capacity of capacitor C is not a fixed value, it is necessary to resort to a more elaborate arrangement as hereinafter described, which, however, is predicated fundamentally upon the same basic principle as that of Figs. 4–6.

Figure 7:
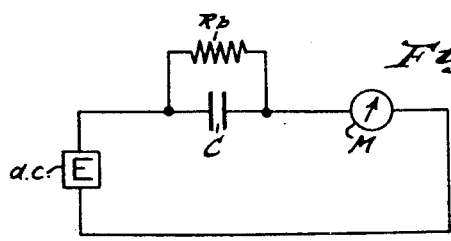

In Fig. 7 there is illustrated the method employed for measuring the so-called leakage resistance of a capacitor. Here the leakage resistance or, more accurately, the leakage conductance is symbolized by a resistor $R_b$ in shunt to capacitor C—which latter is connected in series with a D. C. source E and a D. C. ammeter M. The meter will respond to any substantial leakage current and thus serve to detect any capacitor which is faulty in that respect.

Figure 8:
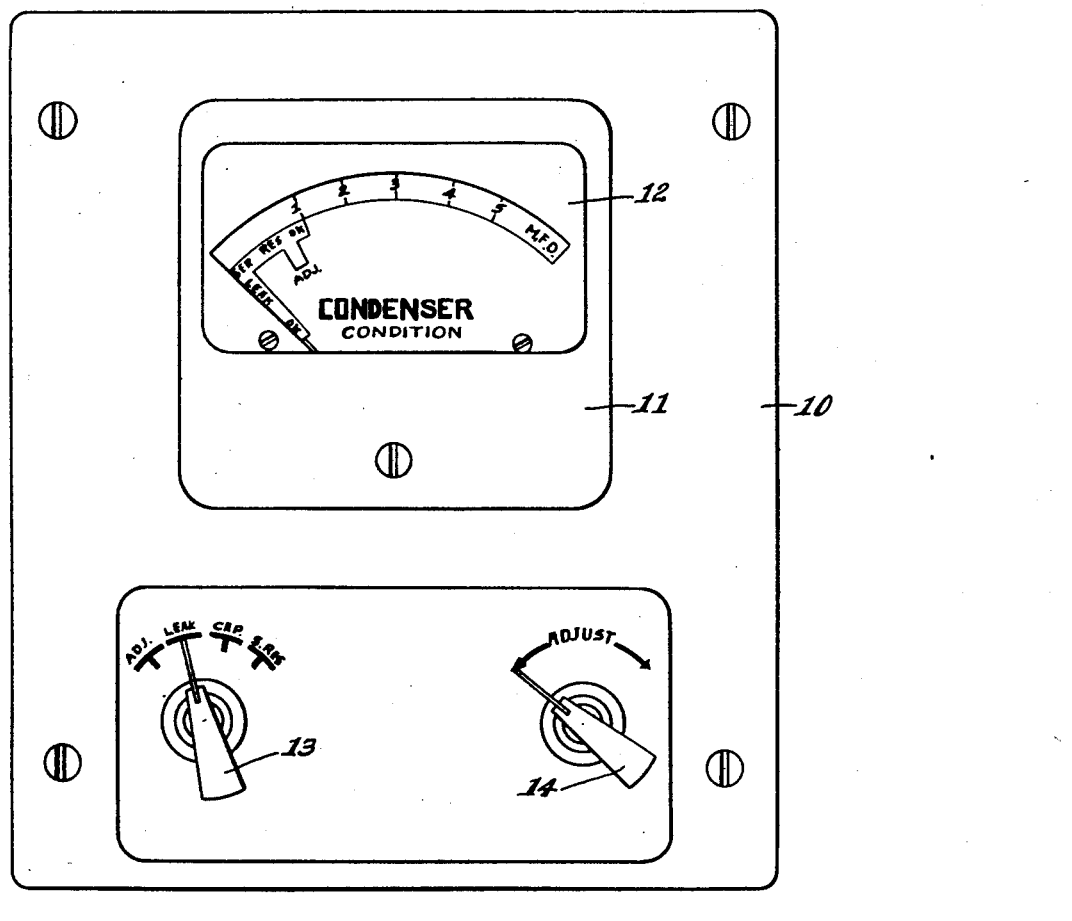
Fig. 8 is a face view of the panel of a testing instrument.

Mounted on panel 10, Fig. 8, is a meter 11, which, as will be observed, has a scale 12 calibrated for capacity readings from .1 to .5 microfarad, and in addition is provided with self-explanatory indicia respecting series resistance and leakage resistance, and a further indicia marked "Adj.," which is utilized in adjusting the instrument preparatory to the making of series resistance measurements. Mounted on panel 10, below meter 11, is a rotatable knob 13, which operates a gang of rotary multi-contact switches whereby the instrument may be conditioned, selectively, for making the various tests, and a second rotatable knob 14, which is connected to the movable contactor of a potentiometer and is used in making certain voltage bias adjustments, as hereinafter described.

Referring now to the circuit diagram of Fig. 9, a pair of conductors 15 and 16 are connected, respectively, to the terminals of a suitable current source 87, such, for example, as a 6-volt storage battery. Conductor 15 extends to the mid-point tap 17 of the primary winding 18 of a transformer 19; and conductor 16 extends to the moving contact member 20 of a vibrator 21, having fixed contacts 22 and 23 connected, respectively, to the two end terminals of said primary winding 18. The vibrator 21 may be electromagnetically driven. The moving contact member or reed 20 alternately engages fixed contacts 22 and 23; and it will be apparent that with the vibrator in operation the two halves of the primary winding are energized alternately, thus producing a symmetrical alternating voltage across the terminals of the secondary winding 24. Said terminals are shunted by a buffer capacitor 25 and connected respectively to the anodes 26 and 27 of a full wave rectifier tube 28. The mid-point 29 of secondary winding 24 is connected via conductor 30 to the D. C. return conductor 31. Rectifier 28 has a cathode heater filament 32 and a cathode 33, which latter is connected via conductor 34 and resistor 35 to the anode 36 of a triode detector tube 37. Resistor 35 may be of 10,000 ohms resistance and forms, in conjunction with a capacitor 38, an R-C filter for smoothing the pulsating current output of rectifier 28. Capacitor 38 may suitably have a capacity of four microfarads. Connected across the output side of the filter, between conductors 31 and 34, is a voltage regulator tube 39, which is shunted by a voltage divider 40, comprising resistors 40a and 40b. Resistor 40a may have a value of 20,000 ohms, while resistor 40b may conveniently have a value of 2,000 ohms. As indicated in the diagram, resistor 40b is the resistance element of a potentiometer having a moving contactor 42.

Detector tube 37 has a control grid 43 and an indirectly heated cathode 44, which elements are interconnected through an input circuit including the secondary winding 45 of a transformer 46, in series with a grid capacitor 47 shunted by a high resistance grid leak 48. Capacitor 47 may have a value of .5 mfd. and resistance 48 may have a value of 15 megohms.

A second triode 49 functions as a direct current amplifier and has a control grid 50 connected directly to cathode 44 of tube 47, a cathode 51 connected through a resistor 53 and conductor 54 to movable contactor 42, and an anode 52 connected via conductor 55 to a fixed contact mark "Adj." of a multiple contact rotary switch 56. Cathode 44 and grid 50 are connected via a resistor 57 to the negative end of voltage divider 40. Resistors 53 and 57 may have values of 10,000 ohms each. In actual practice, I employ a double triode tube of the 6SL7GT type instead of the two tubes 37 and 49, but it is more convenient, for purposes of description, to shown two separate tubes in the diagram.

The meter 11, which may be a D. C. milliammeter, calibrated as shown in Fig. 8, has its negative terminal connected to the movable contactor 58 of rotary switch 56, and its positive terminal to the movable contactor 59 of a second multiple contact rotary switch 60. Each of the two rotary switches 58 and 60 has four fixed contacts marked, respectively, "S" (for series resistance), "C" (for capacity), "L" (for leakage resistance), and "Adj." (for adjust). Said switches, together with two additional rotary switches 61 and 62, are ganged together and driveably connected to the knob 13 shown in Fig. 8. The fixed contacts of switches 61 and 62 bear the same notations as those of switches 58 and 60, and it is to be understood that the four rotary contactors 58, 59, 63 and 64 always engage correspondingly labeled fixed contacts.

The capacitor under test, marked "C," has one terminal connected, via conductors 65, 81 and 16, to the negative terminal of source 87; and the other terminal of said capacitor is connected, via conductor 66, to the "L" contact of switch 58.

Fixed contact "S" of switch 58 is tied to the "Adj." contact of the same switch and is connected, via conductor 55, to anode 52 of tube 49; and the "S" and "Adj." contacts of switch 60 are tied together and connected, via connector 67, to positive conductor 34.

The "L" contact of switch 60 is connected through a 500-ohm resistor 68 and conductor 69 to the cathode terminal of rectifier 28.

One terminal of the primary winding 70 of transformer 46 is connected via conductor 71 to the positive lead 15, and the other terminal of said primary winding is connected to a fixed contact 72 of a vibrator 73. A 10-ohm variable resistor 74 is connected across the terminals of the transformer primary winding. A second fixed contact 75 of vibrator 73 is connected via conductor 76 to the "S" contact of switch 61, which is tied to the "Adj." contact of the same switch and, via conductor 77, to the "C" contact of switch 60.

The positive terminal of capacitor C is connected, via conductors 66 and 78 through a 500-ohm resistor 79 to the "C" contact of rotary switch 62 and through a .1 mfd. capacitor 80 to the rotary contactor 63 of switch 61—which contactor is connected via conductor 81 to the negative lead 16 and via conductor 82 and a .3 mfd. capacitor 83 to the "Adj." contact of switch 62.

The vibratory reed 84 of vibrator 73 is connected through a 1-ohm resistor 85 to the movable contractor 64 of rotary switch 62.

In Fig. 9, the rotary contactors 58, 59, 63 and 64 are all in engagement with their respectively associated "L" contacts—which is the adjustment for testing capacitor C for leakage resistance. It will be understood that capacitor C is located outside the instrument case and is temporarily connected to conductors 65 and 66, for test purposes, through flexible leads.

It will be observed that the "L" contacts of switches 62 and 63 are blanks and that the .1 mfd. capacitor 80 is connected in shunt to capacitor C; also that each of said capacitors is connected through conductor 86, meter 11, resistor 68 and conductors 69 and 34, to the cathode terminal of diode 28—the other terminals of said capacitors being connected to the negative lead 16. The capacitor 80, in shunt to capacitor C, serves no purpose in testing the latter for leakage resistance, but it is useful for other tests and its presence across the capacitor C, when testing for leakage resistance, is purely incidental and harmless. Any leakage current flowing through capacitor C will cause a deflection of meter 11 and if this does not extend beyond the meter scale area marked "Leak O. K."—see Fig. 8—the capacitor under test may be regarded as satisfactory. The function of resistor 68 is to limit the current through meter 11 in event the capacitor under test may prove to be shorted or in event of the test leads being touched together.

For the purpose of describing the manner in which the instrument operates for measuring electrostatic capacity, reference is now made to the circuit diagram of Fig. 10, which shows only those parts and circuit connections of Fig. 9 which enter into the capacity measuring operation.

It will be seen that the capacitor C, under test, is shunted by the .1 mfd. capacitor 80 and that one terminal of each of said capacitors is connected to the negative terminal of source 87, while the remaining terminals of said capacitors are connected to the reed 84 through resistors 79 and 85 in series. The reed 84 is in continuous oscillation, making contact alternately with fixed contacts 72 and 75.

When reed 84 engages contact 72, a capacitor charging circuit is established from the positive terminal of source 87 through primary winding 70 of transformer 76, and through resistor 74 which is in shunt to said primary winding, said circuit also including the resistors 79 and 85 and the movable contactor 64. This results in fully charging both capacitors.

Immediately thereafter, when reed 84 engages fixed contact 75, a circuit is established for discharging both capacitors through the meter 11. This circuit includes resistors 79 and 85, reed 84, fixed contact 75, conductors 76 and 77, movable contactor 59 of rotary switch 60, meter 11, movable contactor 58 of rotary switch 56, conductor 88, movable contactor 63 of rotary switch 61 and conductors 81 and 65.

The shunting capacitor 80 having a capacity of .1 mfd. has, for its purpose, to produce a meter deflection beyond that part of the scale marked "Ser. Res. O. K." even when the capacitor under test is as small as .1 mfd. Except for that factor, capacitor 80 could be omitted.

The function of resistor 79 is that of a current limiter, serving to protect the meter against heavy current surges. The 1-ohm resistor 85 serves no purpose in the capacity test, but is useful for another purpose which will be explained later.

It will be evident that the quantum of capacitor charging current per unit of time is proportional to the combined capacities of capacitors C and 80 and, accordingly, that the quantum of current per unit of time discharged by said capacitors is, likewise, proportional to the combined capacities of said capacitors. Hence, the meter deflection is an accurate measure of the combined capacities. The meter is calibrated to subtract from the scale reading the capacity of capacitor 80 and, therefore, the actual scale reading corresponds to the capacity of capacitor C only.

Series resistance test

With the four rotary switches adjusted so that their movable contactors engage the "S" fixed contacts, the resulting effective network is that shown in Fig. 11. All elements and circuit connections of Fig. 9 which do not participate in the series resistance test have been omitted from Fig. 11 in the interest of clarity.

Referring to Fig. 11, it will be seen that the capacitor C, under test, is connected in shunt to the .1 mfd. capacitor 80 and that said capacitors have a common terminal 88 connected to the negative terminal of the D. C. source 87. The other common terminal of said capacitors (fixed contact "S" of switch 62) is connected through movable contractor 64 and resistor 85 to the vibrator reed 84. When reed 84 engages fixed contact 72, a circuit is completed through shunt resistor 74 and conductor 71 to the positive terminal of source 87, by virtue of which each of said capacitors receives a charge. Immediately thereafter, when reed 84 engages fixed contact 75, said capacitors are discharged through the path which includes resistor 85, conductor 76 and contactor 63.

The magnitude of the initial current through the above-defined capacitor-charging circuit is governed principally by the combined impedances of resistors 74 and 85, plus the combined series resistances of capacitors C and 80. The impedance of primary winding 70 is very high compared to that of resistor 74 and, therefore, does not materially alter the parallel impedance of those two elements; but even if the primary winding impedance were low, that fact would be of no importance here. The important factor is that the capacitative impedance of the charging circuit, due to the reactance of the two capacitors, or either capacitor alone, is so exceedingly small, at the instant when the charging circuit is closed, that the initial current magnitude is substantially independent of the capacity of those capacitors. That is to say, irrespective of whether the series capacity of the charging circuit is large or small, the initial impedance due to said capacity is negligible, and the only impedance which need be considered in determining the peak magnitude of the current flow during each charging period is that due to resistors 74 and 85, plus the series resistance of the parallel-connected capacitors C and 80. But resistors 74 and 85 are set at some fixed values and are not altered by the operator of the instrument; and, therefore, since the supply voltage is constant, the only factor which causes any substantial variation of the peak current magnitude in the charging circuit is the series resistance of the parallel capacitors.

Before proceeding further, it should be pointed out that capacitor 80 performs no essential function in the circuit of Fig. 11. Its usefulness is only in conjunction with the capacity test of Fig. 10; but, on the other hand, it constitutes no impediment to the series resistance test because its series resistance has been measured in advance of its inclusion in the instrument and ascertained to be very low, and the meter calibration takes into account its series resistance. Hence, there is no need to provide additional switching means for cutting capacitor 80 out of circuit. Since the series resistances of two capacitors in parallel have the same combined effect as do ordinary resistors of corresponding magnitude connected in series, the low series resistance of capacitor 80 does not have the effect of reducing the total series resistance. In other words, the series resistance of capacitor 80 does not constitute a low resistance shunt across the series resistance of capacitor C, but, instead, has the effect of a corresponding low resistance in series with the series resistance of capacitor C.

Now, for the sake of simplicity, let us disregard capacitor 80, for the time being, and assume that it is cut out and that we are measuring only the series resistance of capacitor C. Later on, I will show the validity of this assumption.

The peak current pulses traversing the capacitor-charging circuit give rise to a corresponding series of recurrent peak voltage pulses across the terminals of secondary winding 45, which terminals are connected to the input electrodes of detector tube 37; and since the latter is a grid-leak detector, a constant negative potential will accrue on its control grid 43—which negative potential is determined almost entirely by the peak values of potential across the terminals of secondary winding 45. In other words, the average or R. M. S. current in the capacitor-charging circuit is not the determinant as respects the negative potential accruing on grid 43, but rather it is the peak current in that circuit—which peak current is not materially influenced by the magnitude of the capacity of capacitor C, but is influenced by the series resistance of that capacitor.

The plate-cathode current through detector tube 37 is, of course, dependent upon the potential of grid 43—said current decreasing as the grid becomes more negative and vice versa; and it will now be apparent that the greater the series resistance of capacitor C, the greater will be the plate-cathode current through tube 37. The magnitude of plate-cathode current through detector tube 37 could be utilized directly as a measure of series resistance by inserting a meter in conductor 34, but it is preferable to provide an arrangement wherein the current through the meter can be adjusted to produce a given scale reading under a standard condition, and that can best be done by utilizing a second tube, the bias of which can be adjusted independently of tube 37. Thus, I have added tube 49, the grid 50 of which is connected directly to the cathode 44 of tube 37, and in the plate-cathode circuit of which is included the meter 11. Obviously, the plate-cathode current through tube 49 varies in unison with the plate-cathode current through tube 37, but the grid-cathode bias potential of tube 49 can be regulated independently of tube 37 by reason of the fact that cathode 51 is connected to the movable contactor 42 of the voltage divider. The normal potential of cathode 51 can thus be raised or lowered at will, and in that way, the current through meter 11 can be adjusted to produce a given scale reading in response to a pre-established standard condition.

Referring now to Fig. 8, it will be seen that the meter scale includes a segment labeled "Adj.," and the purpose of this is to enable the instrument to be adjusted in advance of a series resistance test, so as to compensate for any condition in the circuit which might give rise to erroneous series resistance indications, which, in turn, might result in either passing bad capacitors or rejecting good ones.

When the instrument has been adjusted in the manner hereinafter described and a capacitor is under test, the series resistance of which is low, the meter reading will fall within the limits of that portion of the meter scale marked "Ser. Res. O. K.," but if the series resistance is excessive, the meter indicator will deflect beyond that portion.

If, when capacitor C is disconnected, a series resistance reading is made on capacitor 80, there will be some deflection of the meter indicator due to the series resistance of capacitor 80; but the meter scale portion, marked "Ser. Res. O. K." is made large enough to allow for that amount of series resistance, plus the permissible series resistance in the capacitor under test.

*Preliminary adjustment*

Prior to each series resistance test, the knob 13 is turned to the "Adj." position and, as a result, the four rotary switches are set as shown in Fig. 12. That figure portrays, schematically, the network which is utilized for adjusting the cathode bias of tube 49, so that the instrument will give a correct series resistance indication, notwithstanding changed circuit conditions which might otherwise impair the accuracy of the reading.

From an examination of Fig. 12, it will be seen that the .3 mfd. capacitor 83 is periodically charged through resistors 74 and 85, and discharged through resistor 85—capacitors 80 and C being out of circuit. This produces a definite negative potential on grid 43 of tube 37 and a corresponding definite negative potential on grid 50 of tube 49; and the plate-cathode current through tube 49 is then determinable by the potential of cathode 51, which is adjustable by moving contactor 42 along potentiometer resistor 40b. Said contactor 42 is thus moved until the indicator of meter 11 registers with the meter scale segment, marked "Adj." By so adjusting the instrument before making a series resistance test, the operator can be assured that the capacitor under test is satisfactory from the standpoint of series resistance, if the indicator shows a reading within that part of the meter scale labeled "Ser. Res. O. K."

Some changes may be made in the construction and arrangement of the parts of my capacitor testing instrument without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a system for measuring the series resistance of an electrostatic capacitor, a charging circuit including a source of current of constant voltage in series with said capacitor, a resistor included in said circuit in series with said capacitor, a discharge circuit for said capacitor, a two-way switch continuously operating to open and close said circuits alternately, a transformer having a primary winding and a secondary winding, said primary winding being connected across said resistor, a grid-leak triode detector having its input electrodes connected across said secondary winding, and a meter responsive to the plate-cathode current through said detector.

2. In a system for measuring the series resistance of an electrostatic capacitor, a charging circuit including a source of current of constant voltage and a D. C. impedance, both in series with said capacitor, switching means for periodically opening and closing said charging circuit, a discharge circuit for said capacitor, means for closing said discharge circuit each time said charging circuit is opened, a detector associated with said D. C. impedance, a meter and a circuit for said meter including a source of current for actuating the meter, said detector being operative to vary the current in said meter circuit in conformity with the magnitude of the peak voltage across said D. C. impedance so that the deflection of said meter is a measure of the series resistance of said capacitor.

3. In a system for measuring the series resistance of an electrostatic capacitor, a charging circuit including a source of current of constant voltage and a D. C. impedance, both in series with said capacitor, switching means for periodically opening and closing said charging circuit, a discharge circuit for said capacitor, means for closing said discharge circuit each time said charging circuit is opened, a triode detector having a grid-cathode circuit including a grid-leak resistor shunted by a grid capacitor, said detector being operatively associated with said impedance so that its grid bias is proportional to the peak voltage developed across said impedance, an anode-cathode circuit for said detector, means for varying the usual grid-cathode potential of said amplifier tube, a meter, and an anode-cathode circuit for said amplifier tube including said meter and a source of current, the arrangement being such that the current through said meter is proportional to the peak voltage across said impedance.

4. In a system for measuring the series resistance of an electrostatic capacitor, a charging circuit including a source of current of constant voltage and a resistor, both in series with said capacitor, a discharge circuit for said capacitor, a continuously operating switch operative periodically and alternately to open and close said circuits whereby to recurrently charge and discharge said capacitor, a transformer having a primary winding and a secondary winding, said primary winding being connected across said resistor, a triode detector having a grid-cathode circuit including the secondary winding of said transformer, said grid-cathode circuit also including a grid-leak resistor shunted by a grid capacitor, an anode-cathode circuit for said detector including a source of current, a triode amplifier having its grid connected to the cathode of said detector, a source of anode-cathode current for said amplifier, a voltage divider connected across said source of current, a movable connection between the cathode of said amplifier and said voltage divider, whereby to vary the normal potential of said cathode, and a meter included in series in the anode-cathode circuit of said amplifier.

ALAN C. WILLIAMS.

REFERENCES CITED

The following references are of record in the file of this patent:

UNITED STATES PATENTS

| Number | Name | Date |
|---|---|---|
| 1,786,910 | Jones | Dec. 30, 1930 |
| 1,823,492 | Houck | Sept. 15, 1931 |
| 2,031,840 | McCarty | Feb. 25, 1936 |
| 2,054,642 | Triplett | Sept. 15, 1936 |
| 2,121,725 | Baumzweiger | June 21, 1938 |

FOREIGN PATENTS

| Number | Country | Date |
|---|---|---|
| 688,226 | France | May 12, 1930 |